United States Patent
Niwa et al.

(10) Patent No.: US 9,593,798 B2
(45) Date of Patent: Mar. 14, 2017

(54) PIPE COVER, PIPE STRUCTURE AND VEHICLE

(75) Inventors: Takahiro Niwa, Tokyo (JP); Akinao Hiraoka, Tokyo (JP); Yoshifumi Fujita, Tokyo (JP); Keiji Tsukahara, Tokyo (JP); Masatake Onodera, Tokyo (JP); Daisuke Ando, Tokyo (JP); Isami Abe, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 0 days.

(21) Appl. No.: 14/130,735

(22) PCT Filed: Jul. 10, 2012

(86) PCT No.: PCT/JP2012/067563
§ 371 (c)(1),
(2), (4) Date: Feb. 5, 2014

(87) PCT Pub. No.: WO2013/008810
PCT Pub. Date: Jan. 17, 2013

(65) Prior Publication Data
US 2014/0144539 A1     May 29, 2014

(30) Foreign Application Priority Data
Jul. 12, 2011 (JP) .................................. 2011-153741

(51) Int. Cl.
*F16L 9/14* (2006.01)
*F16L 59/08* (2006.01)
(Continued)

(52) U.S. Cl.
CPC .............. *F16L 59/08* (2013.01); *F01N 13/148* (2013.01); *F16L 59/029* (2013.01); *F16L 59/143* (2013.01);
(Continued)

(58) Field of Classification Search
CPC ........ F16L 59/08; F16L 59/029; F16L 59/143; F01B 13/148; F01B 2510/02; F01B 2470/00
(Continued)

(56) References Cited

U.S. PATENT DOCUMENTS 3,948,295 A * 4/1976 Lemont et al. ............... 138/147
5,547,734 A * 8/1996 Tusch ....................... B32B 5/26
156/212

(Continued)

FOREIGN PATENT DOCUMENTS

FR    2869949 A    11/2005
GB    2470390 A    11/2010
(Continued)

OTHER PUBLICATIONS

Machine Translation of FR2869949.*
(Continued)

*Primary Examiner* — Paul R Durand
*Assistant Examiner* — Vishal Pancholi
(74) *Attorney, Agent, or Firm* — Westerman, Hattori, Daniels & Adrian, LLP (57) ABSTRACT

A novel pipe cover is disclosed that can suppress thermal deterioration in a member that is positioned opposite to the pipe, and can control the temperature inside the pipe within a given range, even when a high-temperature fluid circulates through the pipe. The pipe cover is used to cover the outer periphery of a pipe, and includes a base that is formed of a tubular heat insulator, and a surface member that covers the outer surface of the base, a heat radiation section and a heat radiation-suppressing section being provided on the outer surface of the surface member, and the emissivity of the heat radiation section at a wavelength of 2 to 15 μm being higher (Continued)

than the emissivity of the heat radiation-suppressing section at a wavelength of 2 to 15 μm.

11 Claims, 3 Drawing Sheets

(51) Int. Cl.
  *F16L 59/14* (2006.01)
  *F01N 13/14* (2010.01)
  *F16L 59/02* (2006.01)
  *F01N 13/16* (2010.01)

(52) U.S. Cl.
  CPC .......... *F01N 13/16* (2013.01); *F01N 2260/02* (2013.01); *F01N 2310/06* (2013.01); *F01N 2470/00* (2013.01); *F01N 2510/02* (2013.01); *F01N 2510/08* (2013.01); *F01N 2530/26* (2013.01)

(58) Field of Classification Search
  USPC ........................................ 138/143, 145, 149
  See application file for complete search history.

(56) References Cited

U.S. PATENT DOCUMENTS

| | | | | |
|---|---|---|---|---|
| 5,589,144 A | * | 12/1996 | Filippi | ...................... C23C 4/10 228/176 |
| 5,896,895 A | * | 4/1999 | Simpkin | ........................ 138/149 |
| 8,028,801 B2 | * | 10/2011 | Niwa et al. | .................... 181/290 |
| 2002/0121309 A1 | * | 9/2002 | Davis et al. | ................... 138/149 |
| 2003/0029607 A1 | * | 2/2003 | Otter | ........................ C25D 7/00 165/133 |
| 2009/0013679 A1 | | 1/2009 | Abe et al. | |
| 2009/0049868 A1 | | 2/2009 | Malloy | |
| 2009/0049869 A1 | * | 2/2009 | Malloy et al. | ................... 66/170 |
| 2010/0180799 A1 | | 7/2010 | Saiki | |
| 2010/0269939 A1 | * | 10/2010 | Ito et al. | ......................... 138/38 |
| 2011/0000575 A1 | * | 1/2011 | Ito et al. | ....................... 138/177 |
| 2011/0041945 A1 | * | 2/2011 | Ohmura et al. | ............. 138/140 |
| 2012/0042981 A1 | * | 2/2012 | Ray et al. | ..................... 138/141 |
| 2012/0073693 A1 | * | 3/2012 | Collier et al. | ................ 138/103 |

FOREIGN PATENT DOCUMENTS

| | | |
|---|---|---|
| JP | 61-057120 U | 4/1986 |
| JP | 11-081976 A | 3/1999 |
| JP | 2008-001309 A | 1/2008 |
| JP | 2008-240589 A | 10/2008 |
| JP | 2010-168998 A | 8/2010 |
| JP | 2010-537141 A | 12/2010 |
| WO | 2012/147517 A1 | 11/2012 |

OTHER PUBLICATIONS

International Search Report of PCT/JP2012/067563, mailing date of Aug. 7, 2012.

Extended European Search Report dated Feb. 13, 2015, issued in corresponding European Patent Application No. 12810601.0 (6 pages).

* cited by examiner

PIPE COVER, PIPE STRUCTURE AND VEHICLE

TECHNICAL FIELD

The invention relates to a pipe cover, a pipe structure, and a vehicle.

BACKGROUND ART

A combustion gas (exhaust gas) discharged from an automotive engine is discharged to the outside through an exhaust manifold, a catalytic converter provided directly below the exhaust manifold, a front tube, an underfloor catalytic converter, a center muffler, a main muffler, and the like (see Patent Document 1 (JP-A-11-81976, for example).

An automotive engine is designed so that the amount of fuel is increased in a high-load/high-revolution region. In this case, a high-temperature exhaust gas flows through the main muffler and the like, and a large amount of heat is released toward the main body of the vehicle positioned opposite to the main muffler and the like. This accelerates thermal deterioration in a resin member or a rubber member (e.g., bumper) that forms the main body, grease applied to a member that forms the main body, or the like.

Therefore, an automotive exhaust pipe (automotive exhaust gas discharge pipe) has been desired that can suppress thermal deterioration in the main body of a vehicle when the automotive engine is operated at high speed.

RELATED-ART DOCUMENT

Patent Document

Patent Document 1: JP-A-11-81976

SUMMARY OF THE INVENTION

Technical Problem

An object of the invention is to provide a novel pipe cover that can suppress thermal deterioration in a member that is positioned opposite to the pipe, and can advantageously suppress an increase in temperature inside the pipe, even when a high-temperature fluid circulates through the pipe, a pipe structure that includes the pipe cover and a pipe, and a vehicle that includes the pipe structure.

Solution to Problem

The inventors of the invention conducted extensive studies in order to achieve the above object. As a result, the inventors found that the above object can be achieved by a pipe cover that includes a base that is formed of a tubular heat insulator, and a surface member that covers the outer surface of the base, wherein a heat radiation section and a heat radiation-suppressing section are provided on the outer surface of the surface member, and the emissivity of the heat radiation section at a wavelength of 2 to 15 μm is higher than the emissivity of the heat radiation-suppressing section at a wavelength of 2 to 15 μm. This finding has led to the completion of the invention.

Specifically, several aspects of the invention provide:

(1) A pipe cover that is used to cover the outer periphery of a pipe, the pipe cover including a base that is formed of a tubular heat insulator, and a surface member that covers the outer surface of the base, a heat radiation section and a heat radiation-suppressing section being provided on the outer surface of the surface member, and the emissivity of the heat radiation section at a wavelength of 2 to 15 μm being higher than the emissivity of the heat radiation-suppressing section at a wavelength of 2 to 15 μm;

(2) The pipe cover according to (1), wherein the surface member is formed of a metal thin film, and the heat radiation section is formed of a ceramic thin film or a carbon thin film;

(3) The pipe cover according to (1), wherein the surface member is formed of a metal thin film, and the heat radiation section is formed of an oxide film of a metal that forms the surface member;

(4) The pipe cover according to any one of (1) to (3), wherein the emissivity of the heat radiation section at a wavelength of 2 to 15 μm is 60 to 99%;

(5) The pipe cover according to (1), wherein the surface member is formed of a metal thin film, and the heat radiation-suppressing section is formed of a coating film of an antioxidant that suppresses oxidation of the metal that forms the surface member;

(6) The pipe cover according to (1) or (5), wherein the emissivity of the heat radiation-suppressing section at a wavelength of 2 to 15 μm is 0.1 to 40%;

(7) A pipe structure including a pipe, and the pipe cover according to (1) that covers the outer periphery of the pipe;

(8) A vehicle including the pipe structure according to (7); and (9) The vehicle according to (8), wherein the pipe structure is an automotive exhaust gas discharge pipe structure.

Advantageous Effects of the Invention

Since the pipe cover according to one aspect of the invention includes the base that is formed of the tubular heat insulator, and the surface member, the heat radiation section, and the heat radiation-suppressing section are provided on the outer surface of the base, it is possible to provide a novel pipe cover that can suppress thermal deterioration in a member positioned opposite to the pipe by means of the base and the heat radiation-suppressing section, and can advantageously suppress an increase in temperature inside the pipe by releasing heat from the heat radiation section through the base, even when a high-temperature fluid circulates through the pipe. It is also possible to provide a pipe structure that includes the pipe cover and a pipe, and a vehicle that includes the pipe structure.

DESCRIPTION OF EMBODIMENTS

A pipe cover according to one embodiment of the invention is described below.

The pipe cover according to one embodiment of the invention is used to cover the outer periphery of a pipe, and includes a base that is formed of a tubular heat insulator, and a surface member that covers the outer surface of the base, a heat radiation section and a heat radiation-suppressing section being provided on the outer surface of the surface member, and the emissivity of the heat radiation section at a wavelength of 2 to 15 μm being higher than the emissivity of the heat radiation-suppressing section at a wavelength of 2 to 15 μm.

The pipe cover according to one embodiment of the invention includes the base that is formed of the tubular heat insulator.

The heat insulator that forms the base included in the pipe cover according to one embodiment of the invention is preferably formed of an inorganic material.

Specific examples of the tubular heat insulator include a heat insulator obtained by forming a mat-shaped product formed of inorganic fibers (e.g., glass fibers, ceramic fibers, or rock wool) (hereinafter referred to as "heat insulator 1") in the shape of a tube.

The tubular heat insulator included in the pipe cover according to one embodiment of the invention may be a heat insulator obtained by forming a laminate in the shape of a tube, the laminate having a configuration in which at least one inorganic heat-resistant paper that is impregnated with an inorganic binder, and at least one metal foil are stacked (hereinafter referred to as "heat insulator 2").

When the tubular heat insulator is formed of the heat insulator 2, colloidal silica, colloidal alumina, and the like are preferable as the inorganic binder.

The primary particle size of the inorganic binder is normally 10 to 20 nm. When using colloidal silica as the inorganic binder, it is preferable that the colloidal silica have a silicic anhydride content of 10 to 40 wt %, and more preferably about 30 wt %, from the viewpoint of storage stability.

The heat resistance of the heat insulator 2 can be easily improved by utilizing the inorganic heat-resistant paper that is impregnated with the inorganic binder.

When the tubular heat insulator included in the pipe cover according to one embodiment of the invention is formed of the heat insulator 2, it is preferable that the inorganic heat-resistant paper that is impregnated with the inorganic binder have an inorganic fiber content of 70 wt % or more. Ceramic-based fibers that exhibit heat resistance are preferable as the inorganic fibers. Specific examples of the inorganic fibers include rock wool, alumina fibers, and the like.

When the tubular heat insulator included in the pipe cover according to one embodiment of the invention is formed of the heat insulator 2, the tubular heat insulator may include an inorganic filler, a small amount of organic fibers, and an organic binder.

Examples of the inorganic filler include aluminum hydroxide, talc, calcium carbonate, and the like.

It is preferable that the heat insulator 2 have a configuration in which the inorganic binder adheres to the inorganic heat-resistant paper in an amount of 30 to 200 parts by weight based on 100 parts by weight of the inorganic heat-resistant paper.

If the inorganic binder adheres to the inorganic heat-resistant paper in an amount of less than 30 parts by weight based on 100 parts by weight of the inorganic heat-resistant paper, the strength retention ratio may decrease, and sufficient heat resistance may not be obtained. If the inorganic binder adheres to the inorganic heat-resistant paper in an amount of more than 200 parts by weight based on 100 parts by weight of the inorganic heat-resistant paper, the secondary particles of colloidal silica that adhere to the inorganic heat-resistant paper may be easily removed.

The heat insulator 2 may be produced by impregnating the inorganic heat-resistant paper with an inorganic impregnation solution such as a colloidal silica solution, and drying the inorganic heat-resistant paper.

When the tubular heat insulator included in the pipe cover according to one embodiment of the invention is formed of the heat insulator 2, the metal foil may be an aluminum foil, a stainless steel foil, a copper foil, or the like, and is preferably an aluminum foil.

The thickness of the metal foil is preferably 0.02 to 0.5 mm, more preferably 0.05 to 0.45 mm, and still more preferably 0.08 to 0.4 mm.

Note that the term "thickness" used herein in connection with the metal foil refers to the arithmetic mean value of the thicknesses of the metal foil measured at five points using calipers.

The heat insulator 2 may include an adhesive layer that is formed between the layers of the laminate obtained by stacking the inorganic heat-resistant paper and the metal foil in order to improve adhesion. The adhesive layer may be formed by applying a heat seal-type adhesive (e.g., polyester-based adhesive, vinyl chloride-based adhesive, or ethylene copolymer-based adhesive), and drying the applied adhesive. The adhesive layer is preferably formed by applying an aqueous ethylene copolymer-based adhesive, and drying the applied adhesive taking account of environmental issues.

The heat insulator 2 may be formed by stacking the inorganic heat-resistant paper and the metal foil while optionally bonding the inorganic heat-resistant paper and the metal foil using the adhesive. The tubular heat insulator is obtained by forming the resulting heat insulator 2 in the shape of a tube.

The tubular heat insulator may be obtained by spirally winding the inorganic heat-resistant paper and the metal foil around a mandrel (core member) in a state in which the inorganic heat-resistant paper and the metal foil are stacked while optionally bonding the inorganic heat-resistant paper and the metal foil using the adhesive. In this case, the resulting product may be pleated by passing the product through a die to provide the product with flexibility.

The heat insulator 2 may have a two-layer configuration in which one metal foil and one inorganic heat-resistant paper are stacked, or may have a configuration formed by three or more layers in which the metal foil and/or the inorganic heat-resistant paper are/is further stacked.

The tubular heat insulator included in the pipe cover according to one embodiment of the invention preferably has a cross-sectional shape corresponding to the cross-sectional shape of the pipe that is covered with the pipe cover. It is preferable that the tubular heat insulator have a circular or elliptical cross-sectional shape.

For example, when the pipe that is covered with the pipe cover according to one embodiment of the invention has a circular cross-sectional shape, it is preferable that the inner diameter of the tubular heat insulator be the same as the outer diameter of the pipe that is covered with the pipe cover.

The thickness of the heat insulator that forms the tubular heat insulator included in the pipe cover according to one embodiment of the invention is preferably 1 to 30 mm, more preferably 3 to 25 mm, and still more preferably 5 to 20 mm.

Note that the term "thickness" used herein in connection with the heat insulator refers to the arithmetic mean value of the thicknesses of the heat insulator measured at five points using a Peacock dial thickness gauge (manufactured by Ozaki Mfg. Co., Ltd.).

The density of the heat insulator that forms the tubular heat insulator included in the pipe cover according to one embodiment of the invention is preferably 50 to 250 g/cm$^3$, more preferably 75 to 200 g/cm$^3$, and still more preferably 100 to 180 g/cm$^3$.

When the thickness and the density of the heat insulator that forms the tubular heat insulator included in the pipe cover according to one embodiment of the invention are within the above ranges, it is possible to easily suppress thermal deterioration in the member that is opposite to the pipe, and easily control the temperature inside the pipe within a given range when the pipe cover is installed together with the pipe.

Since the pipe cover according to one embodiment of the invention is used to cover the outer periphery of the pipe, it is preferable that the tubular heat insulator be split in advance. Specifically, it is preferable that the tubular heat insulator be formed by attaching two semicylindrical members in the shape of a tube, and securing (bonding) the semicylindrical members using the surface member (described below).

The pipe cover according to one embodiment of the invention includes the surface member that is provided on the outer surface of the base that is formed of the tubular heat insulator.

The surface member is preferably formed of a metal thin film. Examples of the metal thin film include an aluminum thin film, a stainless steel thin film, and the like.

The thickness of the surface member is preferably 0.05 to 3 mm, more preferably 0.1 to 2 mm, and still more preferably 0.2 to 1 mm.

Note that the term "thickness" used herein in connection with the surface member refers to the arithmetic mean value of the thicknesses of the surface member measured at five points using calipers.

The surface member included in the pipe cover according to one embodiment of the invention may be integrated with the base that is formed of the tubular heat insulator by applying a heat seal-type adhesive (e.g., polyester-based adhesive, vinyl chloride-based adhesive, or ethylene copolymer-based adhesive) to the base, and bonding the surface member to the base. It is preferable to use an aqueous ethylene copolymer-based adhesive taking account of environmental issues.

The heat radiation section and the heat radiation-suppressing section are provided on the outer surface of the surface member included in the pipe cover according to one embodiment of the invention.

The term "heat radiation section" used herein refers to a member of which the emissivity is controlled to be higher than those of the base and the heat radiation-suppressing section, and the term "heat radiation-suppressing section" used herein refers to a member of which the emissivity is controlled to be lower than those of the base and the heat radiation section.

It is preferable that the heat radiation section and the heat radiation-suppressing section included in the pipe cover according to one embodiment of the invention be formed in the shape of a film.

The emissivity of the heat radiation section and the heat radiation-suppressing section included in the pipe cover according to one embodiment of the invention may be controlled by appropriately selecting materials for forming the heat radiation section and the heat radiation-suppressing section, or adjusting the surface flatness of the heat radiation section and the heat radiation-suppressing section.

It is preferable that the heat radiation section included in the pipe cover according to one embodiment of the invention be formed of a ceramic thin film or a carbon thin film.

Examples of the ceramic thin film include a thin film formed of a material that includes a ceramic (e.g., alumina, silicon carbide, or titanium oxide). The ceramic thin film is preferably a thin film formed of a material that includes alumina.

Examples of the carbon thin film include a diamond-like carbon (DLC) thin film.

When the heat radiation section included in the pipe cover according to one embodiment of the invention is formed of a ceramic thin film, the ceramic thin film may be provided by forming a film of a ceramic material corresponding to the desired ceramic thin film on the outer surface of the surface member using a thermal spraying method, a chemical vapor deposition (CVD) method, or a physical vapor deposition (PVD) method.

When the heat radiation section included in the pipe cover according to one embodiment of the invention is formed of a ceramic thin film, the ceramic thin film may be formed by applying a coating liquid for forming the desired ceramic thin film to the surface of the tubular base, and drying the applied coating liquid.

The coating liquid may include 100 parts by mass of a ceramic powder, 40 to 200 parts by mass (on solid basis) of an inorganic binder, 0.1 to 1.0 part by mass of an organic binder, 0.1 to 1.0 part by mass of a thickener, and 60 to 130 parts by mass of water (solvent), for example.

The inorganic binder may be one or more materials selected from borosilicate glass, colloidal silica, colloidal alumina, and the like. The organic binder may be one or more materials selected from an acrylic-based binder, cationic starch, and the like. The thickener may be one or more materials selected from hi Metolose, bentonite, kaolin, and the like.

The coating liquid may be applied by spraying, brushing, or the like.

When the heat radiation section included in the pipe cover according to one embodiment of the invention is formed of a carbon thin film, the carbon thin film may be provided by forming a film of a material for forming the desired thin film on the surface of the tubular base using a CVD method or a PVD method.

The pipe cover according to one embodiment of the invention may have a configuration in which the surface member is formed of a metal thin film, and the heat radiation section is formed of an oxide film of the metal that forms the surface member.

For example, when the surface member is formed of an aluminum thin film, the heat radiation section is preferably formed of an aluminum oxide film. When the surface member is formed of a stainless steel thin film, the heat radiation section is preferably formed of a stainless steel oxide film.

The oxide film of the metal that forms the surface member may be formed by subjecting the metal thin film that forms the surface member to an alumite treatment, or heating the metal thin film for a desired time using a burner or the like.

When the heat radiation section included in the pipe cover according to one embodiment of the invention is formed of a ceramic thin film, a carbon thin film, or an oxide film of a metal that forms the surface member, the thickness of the heat radiation section is preferably 0.1 to 500 μm, more preferably 0.1 to 200 μm, and still more preferably 0.1 to 100 μm.

When the thickness of the heat radiation section included in the pipe cover according to one embodiment of the invention is within the above range, the temperature inside the pipe can be advantageously suppressed.

The term "thickness" used herein in connection with the heat radiation section refers to a value measured when observing the cross section of the pipe using a scanning electron microscope (SEM).

The emissivity of the heat radiation section included in the pipe cover according to one embodiment of the invention may be increased as compared with that of the heat radiation-suppressing section by forming elevations and depressions on the surface of the heat radiation section.

It is preferable to form such elevations and depressions by subjecting the surface of the surface member to a blasting treatment or the like.

Examples of the blasting technique include an air blasting technique that applies blasting media from a nozzle using compressed air utilizing an air compressor or the like, a shot blasting technique that applies blasting media using the centrifugal force of an impeller made of an abrasion-resistant alloy and driven using a motor, a wet blasting technique that applies blasting media mixed into liquid using a submersible pump or compressed air, and the like.

When subjecting the surface of the surface member to a blasting treatment, the depth of elevations and depressions formed on the surface of the surface member can be controlled by appropriately selecting (adjusting) the type of the blasting media, the average particle size of the blasting media, the blasting media application pressure, the blasting media application time, and the like.

Examples of the blasting media used for the blasting treatment include silicon carbide, alumina, and the like. The average particle size of the blasting media is preferably from 3 to 53 μm.

The term "average particle size" used herein in connection with the blasting media refers to the particle size at 50% (D50) in the cumulative volume particle size distribution measured using a laser diffraction particle size analyzer.

The depth Rz of elevations and depressions formed on the surface of the surface member is preferably 1 to 50 μm, more preferably 2 to 40 μm, and still more preferably 3 to 25 μm.

The term "depth" used herein in connection with elevations and depressions formed on the surface of the surface member refers to a value measured using a stylus-type surface profile analyzer (surface roughness tester).

The pipe cover according to one embodiment of the invention may have a configuration in which a ceramic thin film, a carbon thin film, or an oxide film of a metal that forms the surface member is formed on the surface of the surface member that has been subjected to the blasting treatment. Specific examples of the ceramic thin film, the carbon thin film, or the oxide film include those mentioned above, and the ceramic thin film, the carbon thin film, or the oxide film may be formed by the above method.

The position and the area of the heat radiation section provided on the outer surface of the surface member included in the pipe cover according to one embodiment of the invention may be appropriately determined depending on the installation position of the pipe that is covered with the pipe cover according to one embodiment of the invention, the shape of the member that is opposite to the pipe, the desired heat radiation capability of the pipe cover, and the like.

Figure 1:
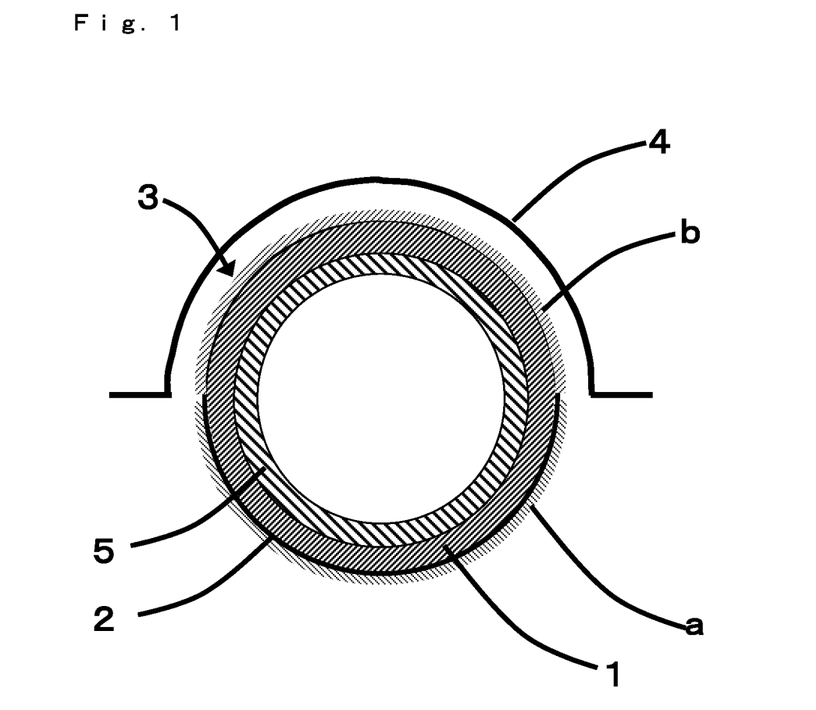
FIG. 1 is a view illustrating an example of usage of a pipe cover according to one embodiment of the invention.

When using the pipe cover according to one embodiment of the invention as a pipe cover that is used to cover an automotive exhaust gas discharge pipe, the heat radiation section is preferably formed over the entire outer surface of the surface member that is positioned opposite to the main body of a vehicle when the pipe cover is installed in the vehicle. For example, when the outer surface of the surface member is divided into two semicylindrical sections, the heat radiation section is preferably formed over the entire outer surface of the semicylindrical section that is positioned opposite to the main body of a vehicle when the pipe cover is installed in the vehicle. As illustrated in FIG. 1 (cross-sectional view), when the outer surface of the surface member 2 provided on the surface of the base 1 formed of the tubular heat insulator is divided into two semicylindrical sections, and a heat radiation section a and a heat radiation-suppressing section b are respectively provided on the two semicylindrical sections to obtain a pipe cover 3, it is preferable that the heat radiation section a be formed on the entire outer surface of the semicylindrical section that is positioned on the side opposite to a main body 4 of a vehicle.

When the heat radiation section a is formed as described above, heat can be effectively released to the side opposite to the main body 4 when the pipe cover 3 is provided around the outer periphery of a pipe 5, and thermal deterioration in the constituent member or the like provided on the side of the main body 4 can be advantageously suppressed.

The area of the heat radiation section included in the pipe cover according to one embodiment of the invention is preferably 20 to 80%, more preferably 30 to 70%, and still more preferably 40 to 60%, based on the total outer surface area of the surface member.

The emissivity of the heat radiation section included in the pipe cover according to one embodiment of the invention at a wavelength of 2 to 15 μm is preferably 60 to 99%, more preferably 70 to 99%, and still more preferably 80 to 99%.

When the emissivity of the heat radiation section included in the pipe cover according to one embodiment of the invention is within the above range, heat can be advantageously dissipated through the heat radiation section from a fluid that circulates through the pipe.

The term "emissivity (%)" used herein refers to a value calculated by the following expression using the reflectance (%) and the transmittance (%) measured when applying electromagnetic waves having a wavelength of 2 to 15 μm to the sample (pipe) at a temperature of 25° C.

Emissivity (%)=100−reflectance−transmittance

Reflectance (%)=(reflected light intensity/incident light intensity)×100

Transmittance (%)=(transmitted light intensity/incident light intensity)×100

Note that the reflectance and the transmittance refer to values measured using a high-temperature reflectance/transmittance measurement device.

Figure 2:
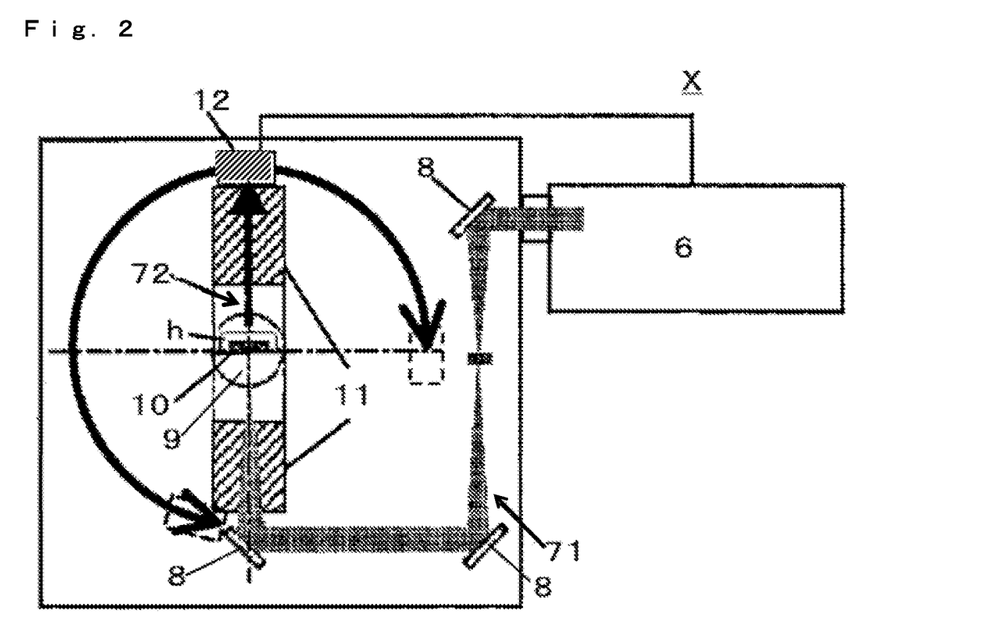
FIG. 2 is a schematic view illustrating a high-temperature reflectance/transmittance measurement device used to measure emissivity.

FIG. 2 schematically illustrates an example of the high-temperature reflectance/transmittance measurement device.

A high-temperature reflectance/transmittance measurement device is configured so that incident light 71 (wavelength: 2 to 15 μm) applied from a Fourier transform infrared spectrophotometer ("FT-IR6100" manufactured by JASCO Corporation) 6 is reflected by mirrors 8, introduced into a sample chamber, and applied to a sample 10 mounted at the center of a rotary stage 9. The sample 10 is heated by halogen heaters 11 ("UL-SH-V500" manufactured by Ushio, Inc.) in a state in which the sample 10 is mounted on a holder h that is provided at the center of the rotary stage 9. The intensity of reflected light from the sample 10 or the intensity of transmitted light 72 is detected by a detector 12 that is provided to an arm section of the rotary stage 9 that rotates around the mounting section for the sample 10, and rotates around the sample 10.

Figure 3:
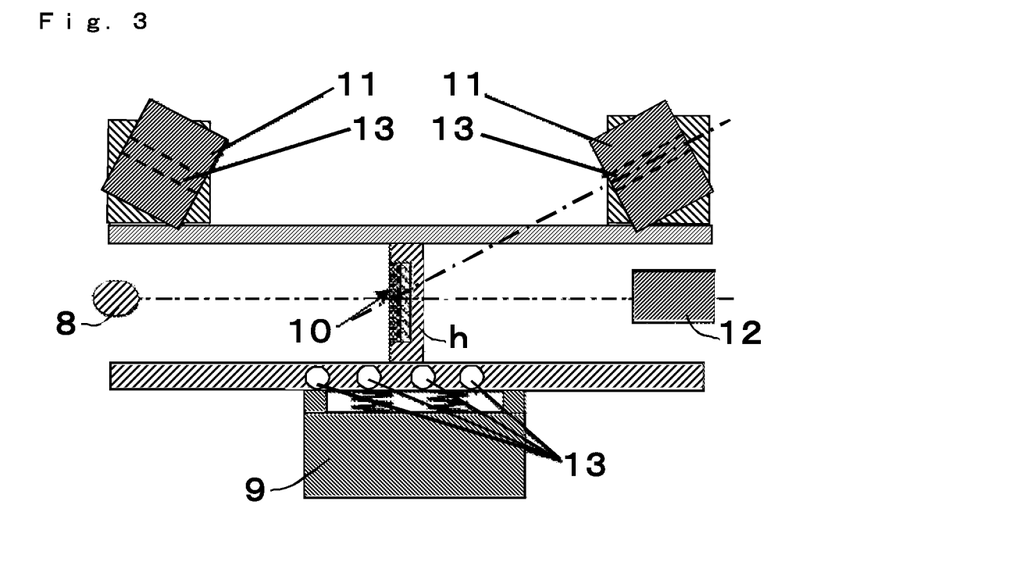
FIG. 3 is a cross-sectional view illustrating a heating section of a high-temperature reflectance/transmittance measurement device used to measure emissivity.

FIG. 3 is a cross-sectional view illustrating an example of the structure of the heating section of the high-temperature reflectance/transmittance measurement device X.

As illustrated in FIG. 3, the halogen heaters 11 are respectively provided on the front side and the back side of the sample 10. The halogen heaters 11 are provided above the sample 10 to form an angle relative to the sample 10 so that the halogen heaters 11 do not block the optical path when the detector 12 detects reflected light or transmitted light from the sample 10. When measuring reflected light or transmitted light, the halogen heaters 11 are rotated together with the sample 10 so that the surface temperature of the sample 10 can be always maintained at a constant temperature. Cooling water 13 is introduced (circulated) from the outside into the bottom of the rotary stage 9 (on which the sample 10 is mounted) and the halogen heaters 11 to effect cooling.

The pipe cover according to one embodiment of the invention preferably has a configuration in which the surface member is formed of a metal thin film, and the heat radiation-suppressing section is formed of a coating film of an antioxidant that suppresses oxidation of the metal that forms the surface member.

A silicon alkoxide such as ethyl silicate, other metal alkoxides, and the like are preferable as the antioxidant.

The coating film of the antioxidant may be formed by applying the antioxidant using a spray, a brush, or the like, reacting the applied antioxidant for a given time, and drying the resulting product.

The heat radiation-suppressing section included in the pipe cover according to one embodiment of the invention may be formed of a thin film that includes aluminum, gold, or platinum. It is preferable that the heat radiation-suppressing section be formed of an aluminum thin film.

When the heat radiation-suppressing section included in the pipe cover according to one embodiment of the invention is formed of a thin film that includes aluminum, gold, or platinum, the thin film may be provided by forming a film of a material corresponding to the desired thin film on the outer surface of the surface member using a thermal spraying method, a CVD method, or a PVD method.

When the material for forming the heat radiation-suppressing section included in the pipe cover according to one embodiment of the invention is the same as the material for forming the surface member, the area of the outer surface of the surface member on which the heat radiation section is not provided may be used directly as the heat radiation-suppressing section.

When the heat radiation-suppressing section included in the pipe cover according to one embodiment of the invention is formed on the outer surface of the surface member in the shape of a film using a thermal spraying method or the like, the thickness of the heat radiation-suppressing section is preferably 0.001 to 100 μm, more preferably 0.001 to 50 μm, and still more preferably 0.001 to 10 μm.

When the thickness of the heat radiation-suppressing section included in the pipe cover according to one embodiment of the invention is within the above range, radiation of heat toward the member positioned opposite to the pipe can be easily suppressed within the desired range.

The term "thickness" used herein in connection with the heat radiation-suppressing section refers to a value measured using an X-ray photoelectron spectroscope (XPS).

The emissivity of the heat radiation-suppressing section included in the pipe cover according to one embodiment of the invention at a wavelength of 2 to 15 μm is preferably 0.1 to 40%, more preferably 0.1 to 35%, and still more preferably 0.1 to 30%.

When the thickness of the heat radiation-suppressing section included in the pipe cover according to one embodiment of the invention is within the above range, radiation of heat toward the member positioned opposite to the pipe that is covered with the pipe cover can be advantageously suppressed.

The position and the area of the heat radiation-suppressing section provided on the outer surface of the surface member included in the pipe cover according to one embodiment of the invention may be appropriately determined depending on the installation position of the pipe that is covered with the pipe cover, the shape of the member that is opposite to the pipe, the desired heat radiation-suppressing capability of the heat radiation-suppressing section, and the like.

When using the pipe cover according to one embodiment of the invention as a pipe cover that is used to cover an automotive exhaust gas discharge pipe, the heat radiation-suppressing section is preferably formed over the entire outer surface of the surface member that is positioned on the side of the main body of a vehicle when the pipe cover is installed in the vehicle. For example, when the outer surface of the surface member is divided into two semicylindrical sections, the heat radiation-suppressing section is preferably formed over the entire outer surface of the semicylindrical section that is positioned on the side of the main body of a vehicle when the pipe cover is installed in the vehicle. As illustrated in FIG. 1 (cross-sectional view), when the outer surface of the surface member 2 provided on the surface of the base 1 formed of the tubular heat insulator is divided into two semicylindrical sections, and the heat radiation section a and the heat radiation-suppressing section b are respectively provided on the two semicylindrical sections to obtain the pipe cover 3, it is preferable that the heat radiation-suppressing section b be formed on the entire outer surface of the semicylindrical section that is positioned on the side of the main body 4 of a vehicle.

When the heat radiation-suppressing section b is formed as described above, radiation of heat toward the main body 4 can be effectively suppressed when the pipe cover 3 is provided around the outer periphery of the pipe 5, and thermal deterioration in the constituent member of the main body 4 can be advantageously suppressed.

The area of the heat radiation-suppressing section included in the pipe cover according to one embodiment of the invention is preferably 20 to 80%, more preferably 30 to 70%, and still more preferably 40 to 60%, based on the total outer surface area of the surface member formed of the tubular heat insulator.

It is preferable that the pipe cover according to one embodiment of the invention be configured so that the heat radiation section and the heat radiation-suppressing section are provided over the entire surface of the surface member so as to be adjacent to each other. In this case, the area ratio (area of heat radiation section:area of heat radiation-suppressing section) of the heat radiation section to the heat radiation-suppressing section is preferably 20:80 to 80:20, more preferably 30:70 to 70:30, and still more preferably 40:60 to 60:40.

The thermal resistance (per 1 m in the circumferential direction) of the surface member included in the pipe cover according to one embodiment of the invention is preferably 10 K/W or less, more preferably 4 to 10 K/W, and still more preferably 4 K/W or less.

The thermal resistance is an index that indicates ease of heat flow.

The term "thermal resistance (R)" used herein refers to a value calculated by "R=d/λ/S", where d is the length (m) (i.e., the circumferential length of a pipe-shaped product formed by the surface member) in the heat flow direction, λ is the thermal conductivity (W·m$^{-1}$·K$^{-1}$) of the surface member, and S is the heat flow area (m$^2$) (length in heat flow direction×longitudinal length of pipe cover).

The length d in the heat flow direction may be measured using calipers. The thermal conductivity λ may be measured using a heat flow meter or the like. The heat flow area S may be measured using a metal measure.

The pipe cover according to one embodiment of the invention may particularly preferably be used when a member (member that is affected by heat) that is positioned opposite to the pipe cover when the pipe cover is provided around a pipe is a member that is formed of a material that exhibits low heat resistance (e.g., resin member or rubber member (e.g., bumper)), or a member to which a material that exhibits low heat resistance (e.g., resin or grease) is applied, for example.

The pipe cover according to one embodiment of the invention may suitably be used for pipes of various vehicles and a semiconductor production system. The pipe cover according to one embodiment of the invention may particularly suitably be used as a pipe cover for an automotive exhaust gas discharge pipe.

Examples of the automotive exhaust gas discharge pipe include exhaust pipes that are connected to an exhaust gas unit that is provided under the floor of a vehicle, and exhaust pipes incorporated in such an exhaust gas unit (e.g., exhaust manifold, catalytic converter provided directly below an exhaust manifold, front tube, underfloor catalytic converter, center muffler, and main muffler).

When using the pipe cover according to one embodiment of the invention for a main muffler, the heat radiation section and the heat radiation-suppressing section may be appropriately provided corresponding to the heat-resistant temperature of a member positioned opposite to the pipe cover. It is preferable to provide the heat radiation section and the heat radiation-suppressing section so that the temperature of a member positioned opposite to the pipe cover is 160° C. or less.

The pipe cover according to one embodiment of the invention is provided around a pipe so that the heat radiation section faces a side where it is desired to promote heat release, and the heat radiation-suppressing section faces a side where it is desired to suppress heat release.

When providing the pipe cover according to one embodiment of the invention around a pipe, the distance between the pipe cover and a member (member that is affected by heat) positioned opposite to the pipe cover is preferably 1 to 100 mm, more preferably 10 to 75 mm, and still more preferably 20 to 50 mm.

The details of a pipe that is covered with the pipe cover according to one embodiment of the invention are described later.

Since the pipe cover according to one embodiment of the invention includes the base that is formed of the tubular heat insulator, and the surface member, the heat radiation section, and the heat radiation-suppressing section are provided on the outer surface of the base, it is possible to provide a novel pipe cover that can suppress thermal deterioration in an opposing member through the base and the heat radiation-suppressing section, and can advantageously suppress an increase in temperature inside the pipe by releasing heat from the heat radiation section through the base, even when a high-temperature fluid circulates through the pipe.

A pipe structure according to one embodiment of the invention is described below.

The pipe structure according to one embodiment of the invention includes a pipe, and the pipe cover according to one embodiment of the invention that covers the outer periphery of the pipe.

The details of the pipe cover according to one embodiment of the invention are the same as described above.

The term "pipe" used herein refers to a tubular product (article) through which a fluid circulates. It is preferable to appropriately select a pipe that is formed of a material corresponding to the temperature and the like of a fluid that circulates through the pipe, and has a structure that does not show deterioration, leakage, and the like.

It is preferable to use a pipe that exhibits heat resistance. Specific examples of the pipe include a metal pipe, a resin pipe formed of a heat-resistant resin, and the like. It is preferable to use a metal pipe.

A stainless steel pipe (SS pipe) is used as the metal pipe from the viewpoint of heat resistance and corrosion resistance. When the temperature of a fluid that circulates through the pipe is less than 500° C., it is preferable to use an aluminum pipe as the pipe. When the temperature of a fluid that circulates through the pipe is 600 to 900° C., it is preferable to use an SS pipe as the pipe.

The cross-sectional shape of the pipe is not particularly limited. The cross-sectional shape of the pipe may be circular, elliptical, or the like.

The average thickness of the pipe is preferably 0.5 to 3.0 mm, more preferably 0.8 to 2.0 mm, and still more preferably 1.0 to 1.5 mm.

Note that the term "average thickness" used herein in connection with the pipe (tubular base) refers to the arithmetic mean value of the thicknesses of the pipe measured at three points using calipers.

The outer diameter of the pipe is preferably 20 to 110 mm, more preferably 30 to 80 mm, and still more preferably 35 to 65 mm.

The term "outer diameter" used herein in connection with the pipe (tubular base) refers to a value measured using calipers.

When the average thickness and the inner diameter of the pipe are within the above ranges, the temperature inside the pipe and the temperature outside the pipe can be easily controlled with a preferable range.

Since the pipe structure according to one embodiment of the invention is provided (covered) with the pipe cover that includes the base that is formed of the tubular heat insulator, and is configured so that the surface member, the heat radiation section, and the heat radiation-suppressing section are provided on the outer surface of the base, it is possible to provide a novel structure that can suppress thermal deterioration in an opposing member through the base and the heat radiation-suppressing section, and can advantageously suppress an increase in temperature inside the pipe by releasing heat from the heat radiation section through the base, even when a high-temperature fluid circulates through the pipe.

A vehicle according to one embodiment of the invention is described below.

The vehicle according to one embodiment of the invention includes the pipe structure according to one embodiment of the invention. The vehicle according to one embodiment of the invention preferably includes the pipe structure according to one embodiment of the invention as an automotive exhaust gas discharge pipe structure.

The details of the pipe structure according to one embodiment of the invention are the same as described above.

The vehicle according to one embodiment of the invention can particularly advantageously suppress thermal deterioration when the vehicle includes a member that is formed of a material that exhibits low heat resistance (e.g., resin member or rubber member (e.g., bumper)), or a member to which a material that exhibits low heat resistance (e.g., resin or grease) is applied, as a member (member that is affected by heat) that is positioned opposite to the pipe.

When the vehicle according to one embodiment of the invention includes the pipe structure according to one embodiment of the invention as an automotive exhaust gas discharge pipe structure, the pipe structure according to one embodiment of the invention may be an exhaust pipe structure that is connected to an exhaust gas unit that is provided under the floor of a vehicle, or an exhaust pipe structure that is incorporated in such an exhaust gas unit (e.g., exhaust manifold, catalytic converter provided directly below an exhaust manifold, front tube, underfloor catalytic converter, center muffler, or main muffler).

The pipe structure is disposed in the vehicle according to one embodiment of the invention so that the heat radiation section faces a side where it is desired to promote release of heat from the pipe, and the heat radiation-suppressing section faces a side where it is desired to suppress release of heat from the pipe.

The vehicle according to one embodiment of the invention preferably has a configuration in which the distance between the pipe structure and a member (member that is affected by heat) positioned opposite to the pipe structure is 1 to 100 mm, more preferably 10 to 75 mm, and still more preferably 20 to 50 mm.

Specific examples of the vehicle according to one embodiment of the invention include an automobile, a two-wheel vehicle, a farm vehicle, and the like.

Since the vehicle according to one embodiment of the invention includes the pipe structure having a configuration in which the outer periphery of the pipe is covered with the pipe cover that includes the base that is formed of the tubular heat insulator, and is configured so that the surface member, the heat radiation section, and the heat radiation-suppressing section are provided on the outer surface of the base, it is possible to provide a novel vehicle that can suppress thermal deterioration in an opposing member through the base and the heat radiation-suppressing section, and can control the temperature inside the pipe within a given range by releasing heat from the heat radiation section through the base, even when a high-temperature fluid circulates through the pipe.

EXAMPLES

The invention is further described below by way of examples. Note that the invention is not limited to the following examples.

Example 1

An SS (stainless steel) pipe (length: 500 mm, outer diameter: 48.6 mm, thickness: 1 mm) was used as the pipe 5 (see FIG. 1).

A halved pipe-shaped product (inner diameter: 48.6 mm) was produced by bonding an aluminum surface member 2 (thickness: 0.3 mm) to the entire surface of a glass fiber mat-shaped product (length: 500 mm, thickness: 10 mm) ("Super Wool Mat" manufactured by Yazawa-Sangyo Co., Ltd., density: 110 kg/m$^3$) using an epoxy-based adhesive. The entire outer surface of the halved pipe-shaped product was divided into two semicylindrical sections. The outer surface of the aluminum surface member 2 was used directly as the heat radiation-suppressing section b (upper semicylindrical section), and an aluminum oxide thin film (thickness: 80 µm) was formed over the entire outer surface of the lower semicylindrical section using a thermal spraying method to form the heat radiation section a to obtain the pipe cover 3.

The pipe cover 3 had a configuration in which the heat radiation section a and the heat radiation-suppressing section b were adjacent to each other, the area of the heat radiation section a was 50% of the total outer surface area of the pipe cover, and the area of the heat radiation-suppressing section b was 50% of the total outer surface area of the pipe cover. The emissivity $\epsilon_1$ of the heat radiation section a at a wavelength of 2 to 15 µm was 80%, and the emissivity $\epsilon_2$ of the heat radiation-suppressing section b at a wavelength of 2 to 15 µm was 1%. The thermal resistance (per 1 m in the circumferential direction) of the outer surface (surface member 2) of the pipe cover 3 was 3.59 K/W.

The pipe cover 3 was wound around the outer periphery of the pipe 5 to prepare a pipe structure in which the outer periphery of the pipe 5 was covered with the pipe cover 3.

A polyimide (PI) resin member (length: 500 mm, equivalent diameter of semicylindrical section (R section): 88.6 mm, thickness: 1 mm, heat-resistant temperature: 350° C.) was provided as a resin member 4 that forms the main body of a vehicle (see FIG. 1). Since the PI resin is a resin that exhibits excellent heat resistance, the PI resin can suitably be used as an alternative to polypropylene and a nitrile-butadiene rubber (NBR) that are normally used as a heat-resistant resin for forming a member that forms the main body of a vehicle. The emissivity $\epsilon_3$ of the resin member 4 at a wavelength of 2 to 15 µm was 95%.

The pipe structure was disposed so that the heat radiation-suppressing section b faced the semicylindrical section (R section) of the resin member 4 at an interval of 10 mm (see FIG. 1), and air (750° C.) was supplied to the inner space of the pipe 5 at room temperature (20° C.) for 30 minutes at a supply rate of 0.01 kg/sec.

The average surface temperature of the heat radiation section a that forms the pipe cover 3 when air was circulated was 195° C., and the average surface temperature of the heat radiation-suppressing section b that forms the pipe cover 3 when air was circulated was 355° C. The average surface temperature and the maximum surface temperature of the resin member 4 when air was circulated were respectively 122° C. and 152° C.

Comparative Example 1

An SS (stainless steel) pipe (length: 500 mm, outer diameter: 48.6 mm, thickness: 1 mm) was used instead of the pipe structure used in Example 1. The SS pipe was disposed to face the resin member 4 (see Example 1) at an interval of 20 mm. Air (750° C.) was then supplied to the inner space of the SS pipe at room temperature (20° C.) for 30 minutes at a supply rate of 0.01 kg/sec.

The average surface temperature of the lower side (i.e., the side opposite to the resin member 4) of the SS pipe when air was circulated was 411° C., and the average surface temperature of the upper side (i.e., the side facing the resin member 4) of the SS pipe when air was circulated was 441° C. The average surface temperature and the maximum surface temperature of the resin member 4 when air was circulated were respectively 204° C. and 249° C.

Since the pipe cover 3 used in Example 1 had a configuration in which the heat radiation section a and the heat radiation-suppressing section b were provided on the outer surface of the pipe 5 through the surface member 2, and the emissivity of the heat radiation section a at a wavelength of 2 to 15 µm was higher than the emissivity of the heat radiation-suppressing section b at a wavelength of 2 to 15 µm, the average surface temperature of the resin member 4 could be suppressed to 122° C., and the maximum surface temperature of the resin member 4 could be suppressed to 152° C.

Therefore, it is considered that thermal deterioration in the resin member 4 that forms the main body of a vehicle can be suppressed when using the pipe structure in which the pipe 5 is covered with the pipe cover 3 as an automotive exhaust gas discharge pipe structure (e.g., muffler).

In Comparative Example 1 in which the entire outer surface of the SS pipe has a uniform emissivity, the average surface temperature and the maximum surface temperature of the resin member 4 were respectively as high as 204° C. and 249° C., and release of heat from the SS pipe could not be sufficiently suppressed. Therefore, it is considered that thermal deterioration in the resin member 4 that forms the main body of a vehicle is accelerated when using the SS pipe used in Comparative Example 1 as an automotive exhaust gas discharge pipe (e.g., muffler).

INDUSTRIAL APPLICABILITY

According to the embodiments of the invention, since the pipe cover includes the base that is formed of the tubular heat insulator, and the surface member, wherein the heat radiation section, and the heat radiation-suppressing section are provided on the outer surface of the base, it is possible to provide a novel pipe cover that can suppress thermal deterioration in a member positioned opposite to the pipe by means of the base and the heat radiation-suppressing section, and can advantageously suppress an increase in temperature inside the pipe by releasing heat from the heat radiation section through the base, even when a high-temperature fluid circulates through the pipe. According to the embodiments of the invention, it is also possible to provide a pipe structure that includes the pipe cover and a pipe, and a vehicle that includes the pipe structure.

REFERENCE SIGNS LIST

1 Base formed of tubular heat insulator
2 Surface member
3 Pipe cover
4 Main body of vehicle
5 Pipe
6 Fourier transform infrared spectrophotometer
71 Incident light
72 Reflected light or transmitted light
8 Mirror
9 Rotary stage
10 Sample
11 Halogen heater
12 Detector
13 Cooling water
a Heat radiation section
b Heat radiation-suppressing section
X High-temperature reflectance/transmittance measurement device
h Holder

The invention claimed is:

1. A pipe cover that is capable of covering an outer periphery of a pipe, the pipe cover comprising:
a base that is formed of a tubular heat insulator, and a surface member that covers an outer surface of the base, a heat radiation section and a heat radiation-suppressing section being provided on an outer surface of the surface member,
wherein the heat radiation section, formed of a ceramic thin film or a carbon thin film, is provided on a portion of the outer surface of the surface member, and the heat radiation-suppressing section is provided on a portion of the outer surface of the surface member opposite from the heat radiation section, and
an emissivity of the heat radiation section at a wavelength of 2 to 15 µm being higher than an emissivity of the heat radiation-suppressing section at a wavelength of 2 to 15 µm,
wherein the surface member is formed of a metal thin film, and the heat radiation-suppressing section is formed of a coating film of an antioxidant that suppresses oxidation of a metal that forms the surface member.

2. The pipe cover according to claim 1, wherein the heat radiation section is formed of an oxide film of a metal that forms the surface member.

3. The pipe cover according to claim 1, wherein the emissivity of the heat radiation section at a wavelength of 2 to 15 µm is 60 to 99%.

4. The pipe cover according to claim 1, wherein the emissivity of the heat radiation-suppressing section at a wavelength of 2 to 15 µm is 0.1 to 40%.

5. A pipe structure comprising a pipe, and the pipe cover according to claim 1 that covers an outer periphery of the pipe.

6. A vehicle comprising the pipe structure according to claim 5.

7. The vehicle according to claim 6, wherein the pipe structure is an automotive exhaust gas discharge pipe structure.

8. The pipe cover according to claim 1, wherein the emissivity of the heat radiation section at a wavelength of 2 to 15 µm is 60 to 99%.

9. The pipe cover according to claim 2, wherein the emissivity of the heat radiation section at a wavelength of 2 to 15 µm is 60 to 99%.

10. The pipe cover according to claim 1, wherein the emissivity of the heat radiation-suppressing section at a wavelength of 2 to 15 µm is 0.1 to 40%.

11. The pipe cover according to claim 1, wherein tubular heat insulator is an inorganic material.

* * * * *